Patented Mar. 28, 1939

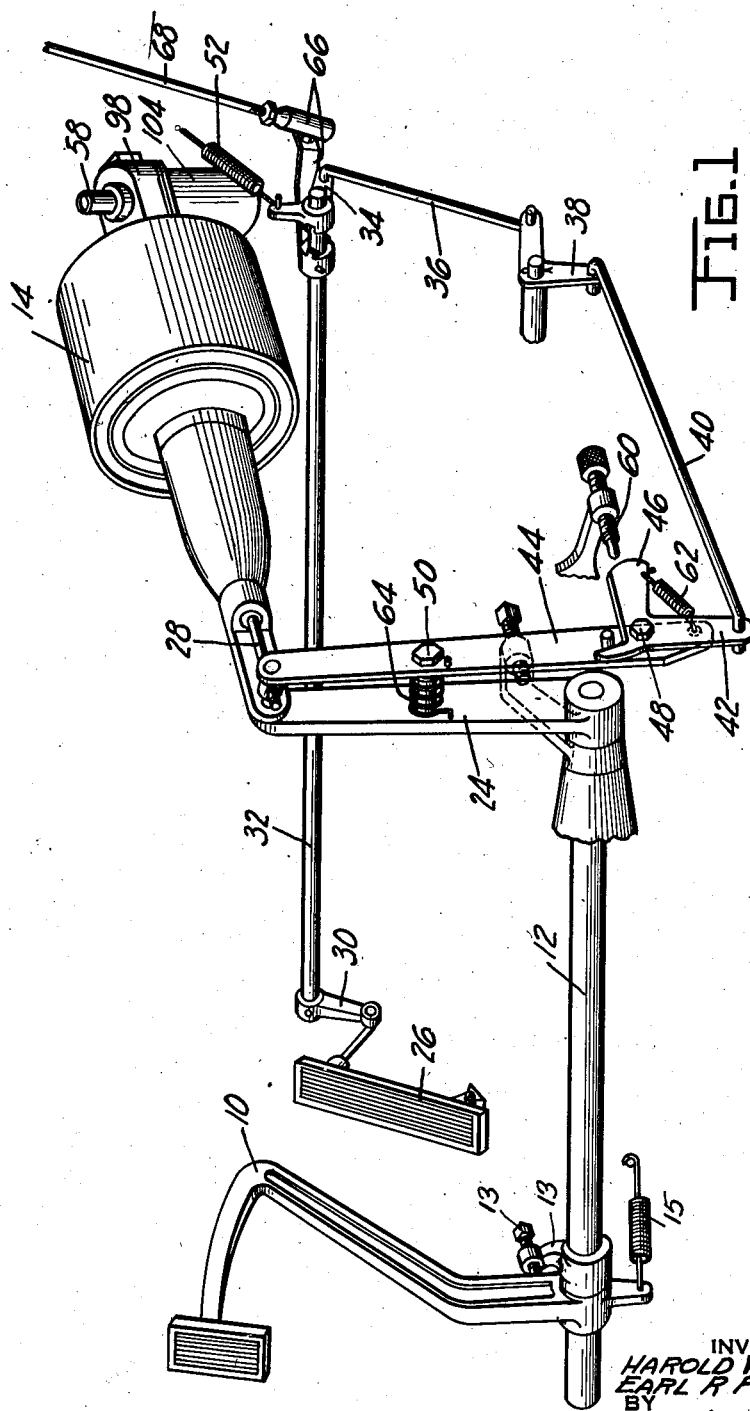

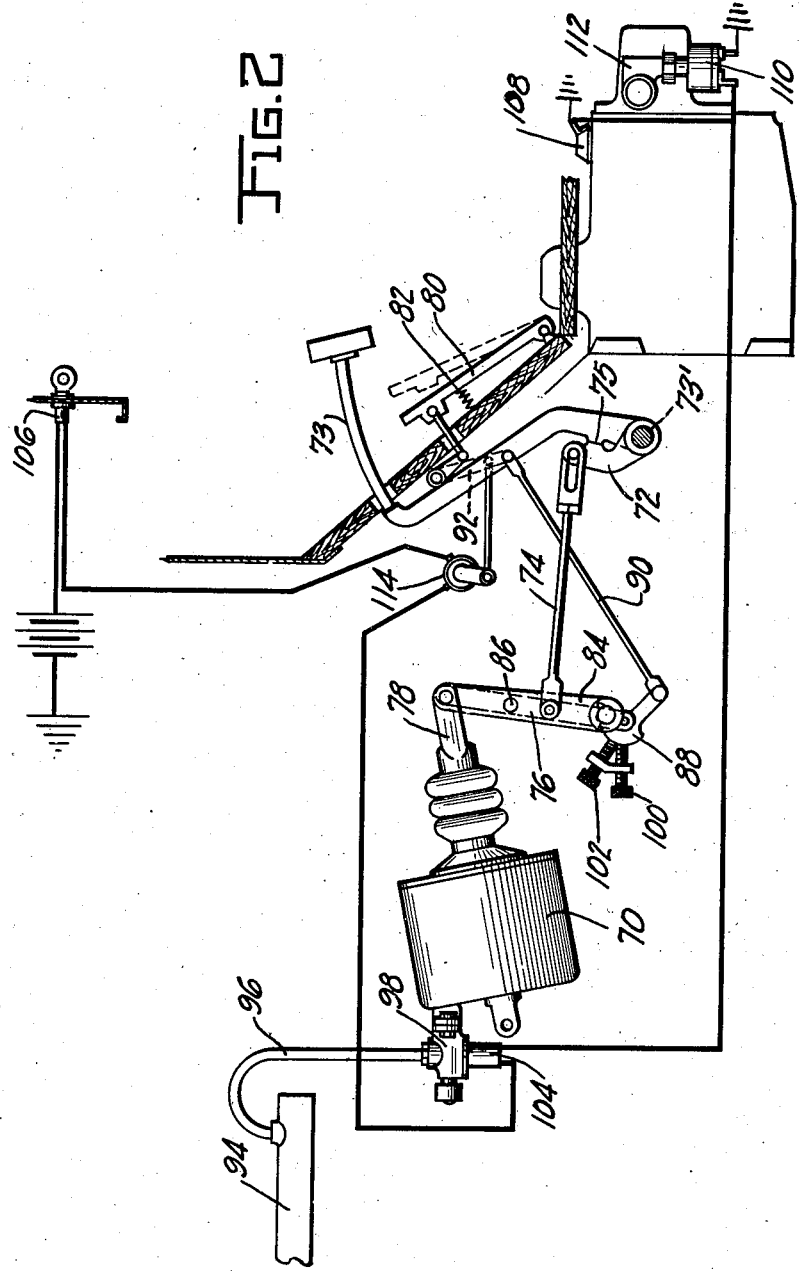

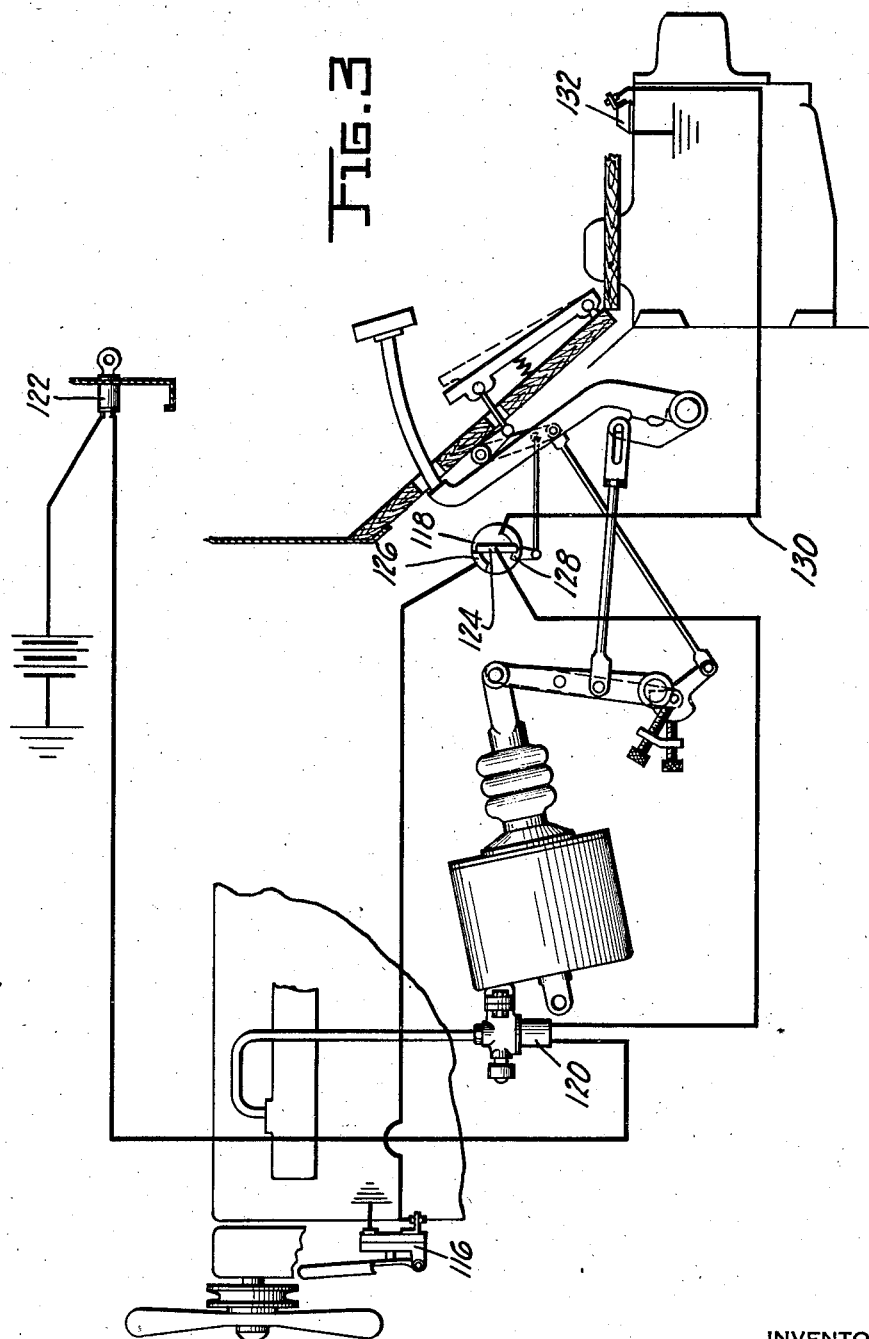

2,152,089

UNITED STATES PATENT OFFICE 2,152,089

CLUTCH CONTROL MECHANISM

Harold W. Price and Earl R. Price, South Bend, Ind., assignors to Bendix Products Corporation, South Bend, Ind., a corporation of Indiana Application September 29, 1937, Serial No. 166,296

4 Claims. (Cl. 192—.01)

This invention relates in general to clutches, and more particularly to power means for operating the clutch of an automotive vehicle.

It is the principal object of the invention to provide a pressure differential operated clutch operating motor controlled by an accelerator operated line type of follow-up valve mechanism.

Yet another object is to provide a valvular control for a power clutch mechanism whereby the clutch is engaged relatively rapidly and uniformly up to the point of clutch plate contact, the remainder of the engagement being in successive relatively small increments of movement to thereby effect a slipping clutch and a smooth engagement.

A further object of the invention is to provide, in an accelerator controlled clutch operating power means, means for temporarily limiting the clutch plate loading to a predetermined maximum in the event the accelerator is opened too quickly. Thus, should the driver inadvertently or by design open the accelerator too widely, the aforementioned means will, nevertheless, obviate a too rapid or grabbing clutch engagement.

Yet another object of the invention is to provide, in conjunction with an accelerator controlled clutch operating mechanism, electro-magnetic means for rendering the mechanism operative only when either the speed of the vehicle or the engine is at or below a predetermined factor or the change-speed transmission is in any setting except high gear. A further object of the invention is to provide, in conjunction either with or without such mechanism, accelerator controlled means for rendering the clutch control mechanism operative only when the accelerator is released to or beyond a certain point in its throw.

Yet another object of the invention is to provide a so-called baby clutch pedal operated clutch control mechanism including a line type of follow-up valve mechanism, thereby providing a so-called booster mechanism for operating the clutch.

Other objects of the invention and desirable details of construction and combinations of parts will become apparent from the following detailed description of certain embodiments of the invention, taken in conjunction with the accompanying drawings illustrating said embodiments, in which:

Figure 1 is a schematic view disclosing the principal elements of my invention;

Figures 2 and 3 are also schematic views disclosing other embodiments of my invention;

In the embodiment of the invention disclosed in Figure 1, a clutch of conventional design, not shown, is adapted to be operated by a clutch pedal lever 10 loosely sleeved over a clutch throwout shaft 12 and operatively connected thereto by means of a lost motion connection including an arm 13 fixedly secured to the shaft 12, an adjustable set screw 13', contactible by the pedal lever 10, being mounted in the end of the arm. A spring 15 serves to return the pedal lever 10 to its off position.

Figure 4:
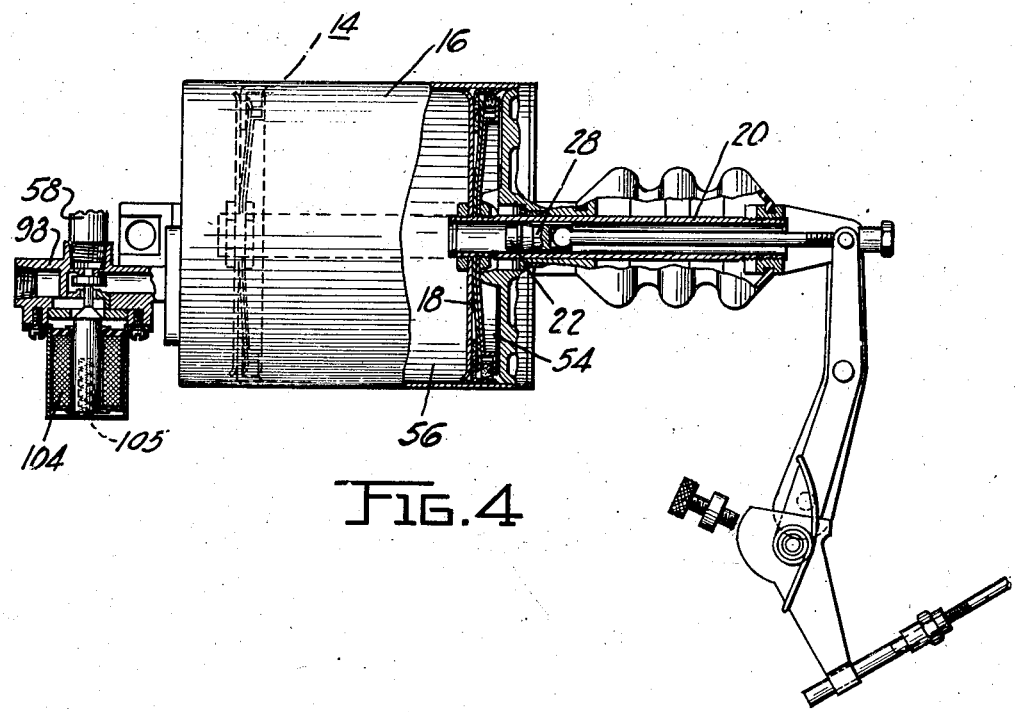
Figure 4 is a sectional view of the clutch operating motor employed in the mechanisms disclosed in Figures 1, 2 and 3.

The invention is particularly directed to power means for operating the clutch to thereby dispense with a manual operation thereof. To this end there is provided a pressure differential operated motor 14 of the vacuum suspended type, said motor comprising, as disclosed in Figure 4, a double-ended cylinder 16, preferably fixed to the chassis, said cylinder housing a reciprocable piston 18. A hollow connecting rod 20 fixedly secured to the piston 18 and provided with a valve opening 22 is operably connected to the aforementioned clutch operating shaft 12 by a crank 24. Completing the description of the valve mechanism and operating linkage therefor, an accelerator 26 is connected with a valve member 28 by means of a crank 30, a shaft 32, a crank 34, a link 36, a crank 38, a link 40, a bell crank lever 42, and a valve operating lever 44. The bell crank lever 42 is curved or cammed at one of its ends 46 for a purpose to be described hereinafter, and is pivotally mounted to the lever 44 at 48. A pin 50 serves to pivotally interconnect the lever 44 and the crank 24.

Describing now the operation of the aforementioned mechanism, upon releasing the accelerator acted upon by a spring 52, the pressure differential acting upon the valve member 28 serves, through the intermediary of the above-described linkage interconnecting the accelerator and valve, to move said member 28 to the left beyond the opening 22, thereby venting a compartment 54 of the motor 14 to the atmosphere via the opening 22 in the hollow rod 20, the latter, as disclosed, being open to the atmosphere. The remaining compartment 56 of the motor is permanently connected to the intake manifold of the internal-combustion engine via a conduit 58. The motor 14 is thus energized, the differential of pressures acting upon the piston 18 serving to move the same to the dotted line position disclosed in Figure 4 to disengage the clutch.

Upon depressing the accelerator, the lever 42 is moved until the cam portion 46 thereof contacts a stop 68, the lever members 42 and 44, by virtue of a spring 62, moving as a unit relative to the crank 24 against the action of a spring 64. The valve 28 is thus moved to cut off the connection between the atmosphere and the compartment 34 and to interconnect said compartment with the partially evacuated compartment 36. The clutch spring then acts to reengage the clutch, the piston 18 moving to lap the valve mechanism and hold the clutch engaged at a point where the plates are about to contact one with another, the cam 46 and stop 68 being adjusted to effect this result. The accelerator is then further depressed, whereby the relatively movable pivotally connected members 42 and 44, aided by the stop 68, act to again crack the valve a relatively small amount. By virtue of a lost motion connection 65, interconnecting the shaft 22 with a throttle operating link 66, the opening of the throttle is preferably, though not necessarily, initiated when the accelerator is further depressed, as just described. The relative timing of operation of the throttle and valve may be varied by adjustment of the connections; furthermore, the position of the cam 46 and the relatively movable link members 42 and 44 provide a leverage-changing connection between the accelerator and valve. The subsequent follow-up to-lap action of the valve mechanism insures a relatively small increment of engaging movement of the clutch, and the concurrent throttle opening movements of the accelerator serve to progressively engage the clutch step by step to thus effect a slipping clutch and a maneuvering control of the vehicle.

Describing now that embodiment of the invention disclosed in Figure 2, a vacuum suspended motor 70, very similar in structure and identical in function with the motor disclosed in Figure 1, is operatively connected to the clutch by means of a crank 72, link 74, a lever member 76 and connecting rod 78. A clutch pedal 79 loosely sleeved over a shaft 78' contacts the crank 72 at 75, thus providing a lost motion connection which permits a manual disengagement of the clutch in the event of the failure of the power means. Describing the operation of this mechanism, and incidentally completing the description of its various elements, upon releasing the accelerator 80, a return spring 82, together with the above-described pressure differential acting upon the valve, serves, through the intermediary of a floating lever member 84 pivotally connected to the lever 76 by a pin 86, a cam-faced bell crank 88 and links 90 and 92, to operate the follow-up mechanism within the motor. The motor is thus connected with an intake manifold 94, via a conduit 96 and a three-way valve 98, Figure 4, to energize the same and effect a disengagement of the clutch. Depression of the accelerator serves to operate the follow-up valve mechanism to effect a two-stage engagement of the clutch, the mechanism of Figure 2 functioning in a manner identical to that of Figure 1. A stop 100 functions as does the stop 68 of Figure 1. Should the driver, either inadvertently or by design, tramp upon the accelerator, the cam-faced bell crank 88 contacts a stop 102. Thus the lever 84 is limited in its rate of movement, and the clutch may not be engaged too quickly, a grabbing clutch being thus avoided.

An important feature of our invention is disclosed in Figure 2 and comprises means for rendering the clutch control mechanism operative only when the transmission is in any gear ratio except high gear or when the transmission is in high gear and the speed of the vehicle is decreased to a predetermined factor; furthermore, the accelerator must be released to or beyond a certain point in its throw. To this end there is provided a solenoid 104, Figure 4, for operating the three-way valve 98, the solenoid being energized to interconnect the manifold 94 with the motor 70 via conduit 96 and valve 98, when an ignition switch 106 and an accelerator operated switch 114 are closed, and either a transmission operated switch 108 or a governor operated switch 110 is closed. When the transmission is being operated in either low or second gear, e. g., during traffic shifts, the solenoid is energized to open the valve 98; or when the transmission is left in high gear after a deceleration of the vehicle, the switch 110 is automatically closed, by means of a speedometer shaft operated governor 112, when the speed of the vehicle is decreased to a point that would cause a choking of the engine if the clutch were not disengaged. When the solenoid 104 is deenergized, the valve 98 is automatically closed, to vent the motor 70 to atmosphere, by means of a spring 105. The accelerator switch 114 is provided to insure a full engagement of the clutch when the accelerator is depressed during a driving operation of the engine. For example, should the engine be laboring on a grade, it is obviously necessary that the clutch be fully engaged. If the follow-up valve mechanism should fail, the switch 114, acting as a safety valve, insures a closing of the valve 98 and a consequent full engagement of the clutch.

In the embodiment of our invention disclosed in Figure 3, an engine fan operated switch 116 is placed in series with an accelerator operated switch 118, a solenoid 120, similar in function to solenoid 104, and an ignition switch 122. When the accelerator is released to a predetermined amount, a conductor or contact 124 in the switch 118 interconnects contacts 126 and 128, thus permitting a disengagement of the clutch, when and if the engine speed has decreased to a certain factor to close the switch 116. The contact 128 of the switch 118 may receive a lead 130 from a transmission operating switch 132, the latter operating in the same manner as the transmission operated switch 108 disclosed in Figure 2. There is thus provided means operative, when the accelerator is sufficiently released and when the engine speed drops to say idling speed, or when the transmission is in any gear except high gear, to permit an operation of the clutch operator. The valve operating linkage of Figure 3 is identical with that disclosed in Figure 2.

Figure 5:
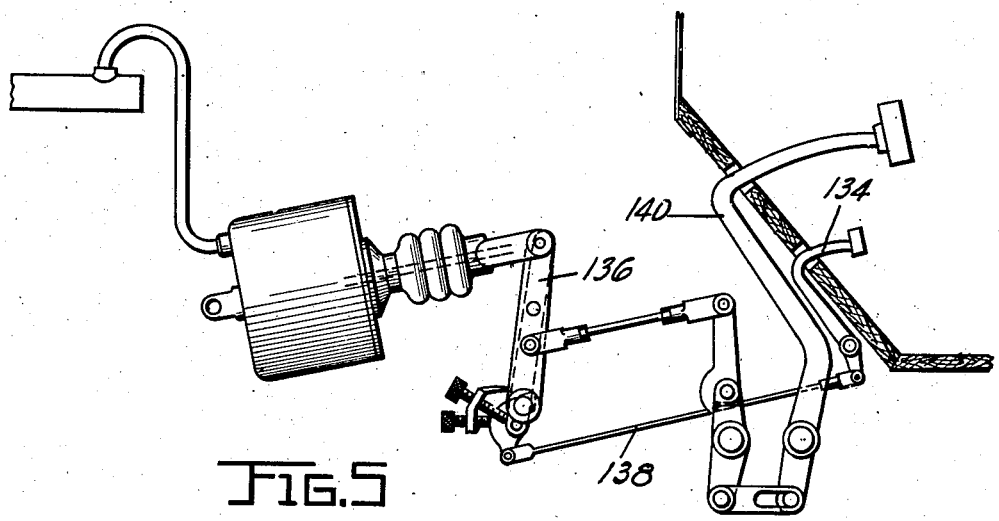
Figure 5 is a schematic view of yet another embodiment of my invention wherein the control of the clutch operating motor is effected by a miniature clutch pedal.

Referring now to Figure 5, there is here disclosed a so-called clutch booster mechanism, such mechanism employing a miniature clutch pedal for operating the clutch. A miniature or so-called baby clutch pedal 134 is operatively connected to valve operating linkage 136, identical with that disclosed in Figures 2 and 3, by a link 138. The remainder of the mechanism disclosed in this figure is, with the omission of the cut-in valve and a slightly different connection between the clutch pedal 140 and valve mechanism, identical with the mechanism disclosed in Figures 2 and 3.

Although this invention has been described in connection with certain specific embodiments, the principles involved are susceptible of numerous other applications that will readily occur to persons skilled in the art. The invention is, therefore, to be limited only as indicated by the scope of the appended claims.

We claim:

1. In an automotive vehicle provided with a clutch and an accelerator, power means for operating the clutch comprising a pressure differential operated motor, means interconnecting said motor, clutch and accelerator including a follow-up valve mechanism for controlling the operation of said motor, said follow-up valve mechanism including a leverage-changing mechanism interconnecting the accelerator, clutch and motor.

2. In an automotive vehicle provided with a clutch and an accelerator, power means for operating the clutch comprising a pressure differential operated motor including a cylinder and a piston, valve means for controlling said motor, and linkage interconnecting said accelerator, valve means, piston and clutch, said linkage including leverage-changing mechanisms for controlling the operation of said valve means.

3. In an automotive vehicle provided with a clutch pedal and an accelerator, power means for operating said pedal comprising a vacuum suspended motor including a double-ended cylinder and a piston, valve means within said motor for controlling the clutch disengaging and engaging operations thereof, and leverage-changing linkage interconnecting said accelerator, piston and valve mechanism.

4. In an automotive vehicle provided with a clutch and an accelerator, power means for operating the clutch comprising a pressure differential operated motor including a cylinder and a piston, valve means for controlling said motor, and linkage interconnecting said accelerator, valve means, piston and clutch, said linkage including leverage-changing mechanisms for controlling the operation of said valve means, said leverage-changing mechanisms including a floating lever member and a bell crank lever connected thereto.

HAROLD W. PRICE.
EARL R. PRICE.